US010833738B2

(12) United States Patent
Nammi

(10) Patent No.: US 10,833,738 B2
(45) Date of Patent: *Nov. 10, 2020

(54) DETECTION SCHEME UTILIZING TRANSMITTER-SUPPLIED NON-LINEARITY DATA IN THE PRESENCE OF TRANSMITTER NON-LINEARITY

(71) Applicant: AT&T Intellectual Property I, L.P., Atlanta, GA (US)

(72) Inventor: SaiRamesh Nammi, Kista (SE)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/682,337

(22) Filed: Nov. 13, 2019

(65) Prior Publication Data
US 2020/0083934 A1    Mar. 12, 2020

Related U.S. Application Data

(63) Continuation of application No. 15/839,172, filed on Dec. 12, 2017, now Pat. No. 10,511,357.

(51) Int. Cl.
| | |
|---|---|
| *H04B 7/04* | (2017.01) |
| *H04B 7/0413* | (2017.01) |
| *H04B 1/04* | (2006.01) |
| *H04B 17/30* | (2015.01) |
| *H04L 29/08* | (2006.01) |
| *H04W 88/02* | (2009.01) |

(Continued)

(52) U.S. Cl.
CPC ............. *H04B 7/0413* (2013.01); *H04B 1/04* (2013.01); *H04B 17/30* (2015.01); *H04L 67/04* (2013.01); *H04L 69/323* (2013.01); *H04B 1/123* (2013.01); *H04B 1/16* (2013.01); *H04W 88/02* (2013.01)

(58) Field of Classification Search
CPC ........ H04B 7/0413; H04B 17/30; H04B 1/04; H04L 67/04; H04L 69/323
USPC ....................................................... 375/267
See application file for complete search history.

(56) References Cited

U.S. PATENT DOCUMENTS

| | | | |
|---|---|---|---|
| 7,873,323 B2 | 1/2011 | Drabeck | |
| 8,340,602 B1 | 12/2012 | Peiris | |
| (Continued) | | | |

FOREIGN PATENT DOCUMENTS

| | | |
|---|---|---|
| WO | 2016045724 | 3/2016 |
| WO | 2016/153404 | 9/2016 |
| (Continued) | | |

OTHER PUBLICATIONS

U.S. Appl. No. 15/839,172, filed Dec. 12, 2017.
(Continued)

*Primary Examiner* — Michael R Neff
(74) *Attorney, Agent, or Firm* — Amin, Turocy & Watson, LLP

(57) ABSTRACT

Improved wireless communications are enabled. For example, a transmitter can characterize a response of non-linear devices associated with an active-array-antenna. Data indicative of the non-linear response is forwarded to a receiving device, which can utilize the data in conjunction with decoding wireless transmissions of the active-array-antenna. Improved bit error rates can be achieved when utilizing transmitter-provided non-linear response data, as provided herein.

20 Claims, 15 Drawing Sheets

(51) Int. Cl.
*H04B 1/16* (2006.01)
*H04B 1/12* (2006.01)

(56) References Cited

U.S. PATENT DOCUMENTS

| | | | |
|---|---|---|---|
| 8,553,821 | B1 | 10/2013 | Eliaz |
| 8,615,204 | B2 | 12/2013 | Husted |
| 9,130,628 | B1 | 9/2015 | Mittal |
| 9,484,962 | B1 | 11/2016 | Magesacher |
| 9,590,664 | B2 | 3/2017 | Rexberg |
| 9,596,676 | B2 | 3/2017 | Gotman |
| 9,621,236 | B2 | 4/2017 | Ghannouchi |
| 9,647,866 | B2 | 5/2017 | Wang |
| 9,735,814 | B1 | 8/2017 | Jin |
| 10,511,357 | B2 * | 12/2019 | Nammi .................... H04B 1/04 |
| 2010/0316157 | A1 * | 12/2010 | Bassam ............. H04L 25/03343 375/267 |
| 2015/0311926 | A1 | 10/2015 | Eliaz et al. |
| 2016/0049997 | A1 | 2/2016 | Onodera |
| 2016/0191176 | A1 | 6/2016 | O'keeffe |
| 2016/0261295 | A1 | 9/2016 | Astrom |
| 2017/0079047 | A1 | 3/2017 | Lee |
| 2017/0126261 | A1 | 5/2017 | Singerl |
| 2017/0176507 | A1 | 6/2017 | O'keeffe |
| 2017/0214438 | A1 | 7/2017 | Ghannouchi |

FOREIGN PATENT DOCUMENTS

| | | |
|---|---|---|
| WO | 2017/079244 | 5/2017 |
| WO | 2017/091119 | 6/2017 |
| WO | 2017/097335 | 6/2017 |

OTHER PUBLICATIONS

Amin et al., "Behavioral modeling and linearization of crosstalk and memory effects in RF MIMO transmitters" IEEE transactions on microwave theory and techniques vol. 62, No. 4, Apr. 2014, pp. 810-823.

Sim et al., "Nonlinear Self-Interference Cancellation for Full-Duplex Radios: From Link-Level and System-Level Performance Perspectives" IEEE Communications Magazine, Feb. 15, 2017, 11 pages.

LogiCORE IP Digital Pre-Distortion v5.0 XILINX®:, xilinx. com, Jun. 22, 2011, 66 pages.

Non-Final Office Action received for U.S. Appl. No. 15/839,172 dated Mar. 11, 2019, 31 pages.

Notice of Allowance for U.S. Appl. No. 15/839,172 dated Aug. 14, 2019, 19 pages.

* cited by examiner

EXAMPLE NON-LINEAR DATA MODELS AND
FORMATS FOR TRANSMISSION

900

| MODEL TYPE 902 | INDEX 904 | ORDER 906 | MEMORY LENGTH 908 | CO-EFFICIENTS 910 |
|---|---|---|---|---|
| VOLTERA SERIES | 0 0 | K | M | A1, A2, ... |
| POLYNOMIAL | 0 1 | K | M | A1, A2, ... |
| MEMORY POLYNOMIAL | 1 0 | K | M | A1, A2, ... |

```
┌─────────────────────────────────────────────────────────────┐
│ INITIATING, BY A SYSTEM COMPRISING A PROCESSOR, A           │─ 1302
│ NON-LINEAR ELECTRONIC DEVICE IN CONJUNCTION WITH A          │
│ MIMO WIRELESS TRANSMISSION                                  │
└─────────────────────────────────────────────────────────────┘
                              ▼
┌─────────────────────────────────────────────────────────────┐
│ FITTING, BY THE SYSTEM, A NON-LINEAR RESPONSE OF THE        │─ 1304
│ NON-LINEAR ELECTRONIC DEVICE TO A MATHEMATICAL              │
│ MODEL                                                       │
└─────────────────────────────────────────────────────────────┘
                              ▼
┌─────────────────────────────────────────────────────────────┐
│ WRITING COEFFICIENTS, ORDER AND MEMORY LENGTH OF            │─ 1306
│ THE MATHEMATICAL MODEL TO A DATA MESSAGE                    │
└─────────────────────────────────────────────────────────────┘
                              ▼
┌─────────────────────────────────────────────────────────────┐
│ SPECIFYING A TYPE AND INDEX OF THE MATHEMATICAL             │─ 1308
│ MODEL IN THE DATA MESSAGE                                   │
└─────────────────────────────────────────────────────────────┘
                              ▼
┌─────────────────────────────────────────────────────────────┐
│ TRANSMITTING THE DATA MESSAGE TO A MIMO RECEIVER            │─ 1310
│ DEVICE OF THE MIMO WIRELESS TRANSMISSION                    │
└─────────────────────────────────────────────────────────────┘
```

FIG. 13

DETECTION SCHEME UTILIZING TRANSMITTER-SUPPLIED NON-LINEARITY DATA IN THE PRESENCE OF TRANSMITTER NON-LINEARITY

RELATED APPLICATION

The subject patent application is a continuation of, and claims priority to, U.S. patent application Ser. No. 15/839,172, filed Dec. 12, 2017, and entitled "DETECTION SCHEME UTILIZING TRANSMITTER-SUPPLIED NON-LINEARITY DATA IN THE PRESENCE OF TRANSMITTER NON-LINEARITY," the entirety of which application is hereby incorporated by reference herein.

TECHNICAL FIELD

The present application relates generally to the field of wireless communication, and, for example, to transmitter-mapped nonlinearity data utilized for decoding multiple input multiple output (MIMO) wireless transmissions.

BACKGROUND

Radio technologies in cellular communications have grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). Fifth generation (5G) access networks, which can also be referred to as New Radio (NR) access networks, are currently being developed and expected to fulfill the demand for exponentially increasing data traffic, and to handle a very wide range of use cases and requirements, including among others mobile broadband (MBB) and machine type communications (e.g., involving Internet of Things (IOT) devices).

The upcoming 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. MIMO techniques can improve mmWave communications, and has been widely recognized a potentially important component for access networks operating in higher frequencies. MIMO can be used for achieving diversity gain, spatial multiplexing gain and beamforming gain. For these reasons, MIMO systems, including massive MIMO systems using a large number of antennas, can be an important part of the 3rd and 4th generation wireless systems, and are planned for use in 5G systems.

The above-described background relating to wireless networks is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 9 illustrates a table of an example format for data transmission of non-linearity data, according to additional aspects of the present disclosure.

FIG. 13 shows a flowchart of a sample method for facilitating improved signal processing utilizing transmitter-provided non-linearity data, in yet other embodiments.

DETAILED DESCRIPTION

Figure 1:
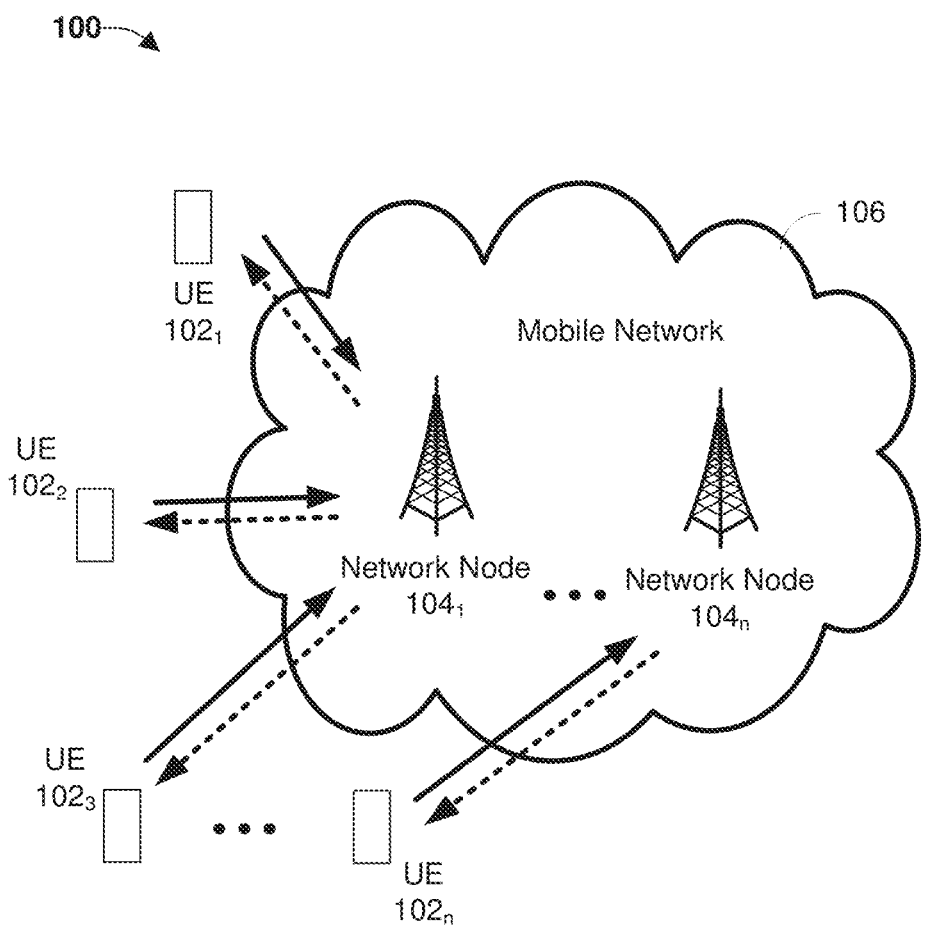
FIG. 1 illustrates a sample wireless communication system with a network node device that communicates with a user equipment in one or more embodiments.

The following description and the annexed drawings set forth in detail certain illustrative aspects of the subject matter. However, these aspects are indicative of but a few of the various ways in which the principles of the subject matter can be implemented or employed. Other aspects, advantages, and novel features of the disclosed subject matter will become apparent from the following detailed description when considered in conjunction with the provided drawings. In the following description, for purposes of explanation, numerous specific details are set forth to provide an understanding of the subject disclosure. It may be evident, however, that the subject disclosure may be practiced without these specific details. In other instances, well-known structures and devices are shown in block diagram form in order to facilitate describing the subject disclosure. For example, the methods (e.g., processes and logic flows) described in this specification can be performed by devices (e.g., a user equipment (UE), a network node device, etc.) comprising programmable processors that execute machine executable instructions to facilitate performance of operations described herein. Examples of such devices can be devices comprising circuitry and components as described in FIG. 13 and FIG. 14, infra.

The present patent application relates at a high level to characterizing a non-linear response(s) of a device(s) connected with a transmit amplifier, and providing data to recreate the non-linear response to a receiving device. The non-linear response can be characterized at a transmitter device, which determines an output of the non-linear device(s) as a function of an input to the device(s). This characterization at the transmitter device, when forwarded to the receiving device, enables increased efficiency and accuracy in signal processing for the receiving device, enhancing channel filtering and improving bit error rates. In some embodiments, the non-linear response can be characterized by fitting a basis function to the non-linear response and providing coefficients and indicia indicative of the basis function to a receiving device. The receiving device can recreate the non-linear response function and utilize this function in decoding a received wireless transmission. In various embodiments, a transmitter-supplied non-linear response can be employed in decoding a multiple-input, multiple-output (MIMO) wireless transmission (e.g., a massive MIMO transmission utilizing many wireless antennas employed for a 5G wireless system), in lieu of or in addition to other signal processing techniques. For instance, in some embodiments the transmitter-supplied non-linear response function can be employed in lieu of digital pre-distortion of an input signal to a non-linear device. In other embodiments, the transmitter-supplied non-linear response function can be implemented in conjunction with digital pre-distortion (DPD) techniques, which can be characterized with the non-linear response. In further embodiments, the non-linear response can be a static response, transmitted during call setup signaling or physical layer transmissions, or can be a dynamic response transmitted (and updated) at physical layer transmissions.

FIG. 1 illustrates an example mobile communication system 100 (also referred to as mobile system 100) in accordance with various aspects and embodiments of the subject disclosure. In example embodiments (also referred to as non-limiting embodiments), mobile system 100 can comprise a mobile (also referred to as cellular) network 106, which can comprise one or more mobile networks typically operated by communication service providers (e.g., mobile network 106). The mobile system 100 can also comprise one or more user equipment (UE) $102_{1-n}$ (also referred to as user devices, where n is a suitable integer greater than 0). The UEs $102_{1-n}$ can communicate with one another via one or more network node devices (also referred to as network nodes) $104_{1-n}$ (referred to as network node 104 in the singular) of the mobile network 106. The dashed arrow lines from the network nodes $104_{1-n}$ to the UE $102_{1-n}$ represent downlink (DL) communications and the solid arrow lines from the UE $102_{1-n}$ to the network nodes $104_{1-n}$ represent uplink (UL) communications.

UE $102_{1-n}$ can comprise, for example, any type of device that can communicate with mobile network 106, as well as other networks (see below). The UE $102_{1-n}$ can have one or more antenna panels having vertical and horizontal elements. Examples of a UE $102_{1-n}$ comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. UE $102_{1-n}$ can also comprise IOT devices that communicate wirelessly.

Mobile network 106 can include various types of disparate networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, mobile network 100 can be or can include a large scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE $102_{1-n}$ and the network node 104). While example embodiments might be described for 5G new radio (NR) systems, the embodiments can be applicable to any radio access technology (RAT) or multi-RAT system where the UE operates using multiple carriers. For example, mobile system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE $102_{1-n}$ can be communicatively coupled (or in other words, connected) to a network node 104 of the mobile network 106. Network node 104 can have a cabinet and other protected enclosures, an antenna mast, and multiple antennas for performing various transmission operations (e.g., MIMO operations). Each network node 104 can serve several cells, or sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay, a donor node controlling relay, a base transceiver station (BTS), an access point, a transmission point (TP), a transmission/receive point (TRP), a transmission node, a remote radio unit (RRU, described further below), a remote radio head (RRH), nodes in distributed antenna system (DAS), and the like. In 5G terminology, the network node is referred to by some as a gNodeB device.

Still referring to FIG. 1, in various embodiments, mobile network 106 can be configured to provide and employ 5G cellular networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Still referring to FIG. 1, to meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 Gbps to be offered simultaneously to tens of workers on the same office floor, for example; several hundreds of thousands of simultaneous connections to be supported for massive sensor deployments; improved coverage, enhanced signaling efficiency; reduced latency compared to LTE, among others.

MIMO systems are expected to employ active-array-antenna systems in which radio frequency (RF) devices such as power amplifiers, transceivers, analog to digital converters and other electronic devices are integrated with an array of antenna elements. These active array antenna systems provide several benefits over passive antenna systems in which antennas are connected to transceivers through feeder cables. These benefits include simplified installation, reduction in cable losses, reduced energy consumption and improved performance. Moreover, active antenna systems can be effective in implementing cell specific beamforming, user specific beamforming, vertical sectorization, massive MIMO, elevation beamforming, and so on. For 5G implementations, requirements and test methodologies have been initiated for full-dimensional MIMO (FD-MIMO) systems involving 16, 32 or 64 active array antennas to achieve the high service and efficiency goals proposed for 5G networks.

Figure 2:
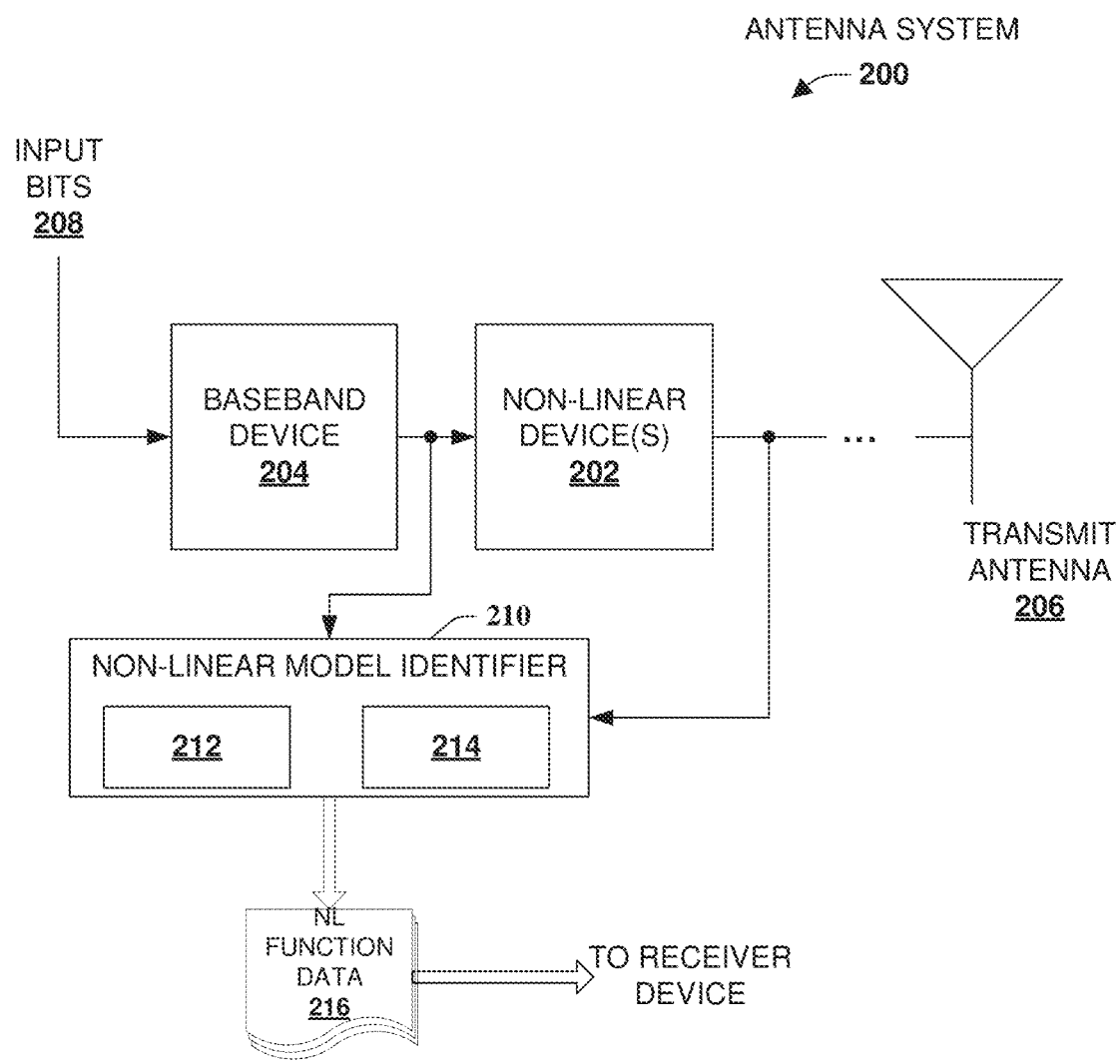
FIG. 2 depicts a block diagram of an example transmit antenna system having a non-linear device according to one or more embodiments of the present disclosure.

Referring now to FIG. 2, a block diagram of an example transmit antenna system 200 is illustrated, according to one or more aspects of the present disclosure. Transmit antenna system 200 can be an active-array-antenna system, in various embodiments. Moreover, transmit antenna system 200 can facilitate improved signal processing to achieve favorable spectral density and bit error rates at an associated receiver device (not depicted, but see, e.g., UE $102_{1-n}$ of FIG. 1, supra, or multiple-input, multiple-output (MIMO) receiving device 820 of FIG. 8, infra). In further embodiments, antenna system 200 can replace other signal processing techniques that have high power consumption and processing overhead, the costs of which can be additive in systems with large numbers of antennas (e.g., massive MIMO systems), to further magnify these benefits.

Transmit antenna system 200 can comprise one or more non-linear devices 202 operably connected to an antenna 206 (e.g., a transmit antenna, but also a receive antenna). Non-linear device(s) 202 receives a baseband signal comprising signal processed input bits 208 from a baseband device 204. Non-linear device(s) 202 generates a non-linear device output that is provided to antenna 206. The non-linear device output can vary depending on a type and function of non-linear device(s) 202. For instance, in an embodiment where non-linear device(s) 202 is a signal amplifier, the non-linear device output can be a non-linear amplified signal. The subject disclosure is not so limited, however, and in other embodiments non-linear device(s) 202 can be multiple power amplifiers, one or more digital to analog converters (DACs), one or more analog to digital converters (ADCs), one or more local oscillators, or one or more other non-linear devices known in the art, or a suitable combination of the foregoing. Where non-linear device(s) 202 comprises multiple non-linear devices, the non-linear device output can be an aggregated non-linear output of these devices in some embodiments, separate non-linear device outputs of each device, or an aggregate of some device outputs and a separate non-linear device output for other such devices.

The baseband signal and the non-linear device output is provided to a non-linear model identifier 210. Non-linear model identifier 210 can comprise a processor 212 and memory 214 to store executable instructions that, when executed by the processor, facilitate performance of operations of non-linear model identifier 210. These operations can include identifying (e.g., estimating) the non-linearity (e.g., a non-linear response) of the non-linear device output as a function F(x) of the baseband signal (for a more detailed discussion of the non-linear response of a MIMO communication with t transmit antennas and r receive antennas, see FIG. 8, infra).

Identifying non-linearity of non-linear device(s) 202 can be implemented using mathematical characterization of the non-linear device output as a function of the baseband signal. Examples can include a polynomial fit between an input signal (x) (e.g., the baseband signal, or input bits 208 in an embodiment) to non-linear device(s) 202, and output signal (y) of non-linear device(s) 202, or y=f(x). Characterized differently, non-linear model identifier 210 can estimate the function f(•) that represents the non-linear response of non-linear device(s) 202 (e.g., see FIG. 3, infra, for an example non-linear response of an example power amplifier, for illustration). Non-linear model identifier 210 can employ various algorithms for estimating the non-linear response f(•) of non-linear device(s) 202, including algorithms based on criterion minimization, e.g., solving a least squares problem, or can be based on Bayesian techniques where Kalman filtering is employed, or other algorithms known in the art for characterizing non-linear functions. In at least one embodiment, non-linear model identifier 210 can estimate a separate function $f(•)_{n'}$ for each of n' non-linear device(s) operably coupled to one of n' antennas, where n' is a suitable integer greater than 1 (e.g., see FIG. 7, infra). In other embodiments, e.g., where the non-linear device per antenna branch is the same, or has a same or reasonably same non-linear function f(•) (e.g., where $f(•)_{n'}$ is the same or substantially the same for each of the n' non-linear devices), non-linear model identifier can estimate the non-linear response function f(•) for one such device and impute the function to each antenna branch. Non-linear model identifier can generate non-linear function data characterizing the non-linear response function of non-linear device(s) 202, and provide the non-linear function data in a non-linear function data message 216 for transmission to a receiving device.

In general, wireless communications employ a channel encoder and channel decoder to improve bit error rate performance. Most channel decoders are soft input and soft output (SISO) decoders, or soft input hard output (SIHO) decoders. In both cases, a receiving device employs soft input information to determine the bits received in a received wireless transmission. Because a non-linear response of an active array antenna can affect transmitted, and thus received, wireless signals, the receiving device can utilize the non-linear function data provided in non-linear function data message 216 at least in part to generate soft information for decoding wireless transmissions of transmit antenna system 200. As a result, improved bit error performance can be achieved (e.g., see FIG. 4, infra).

Figure 3:
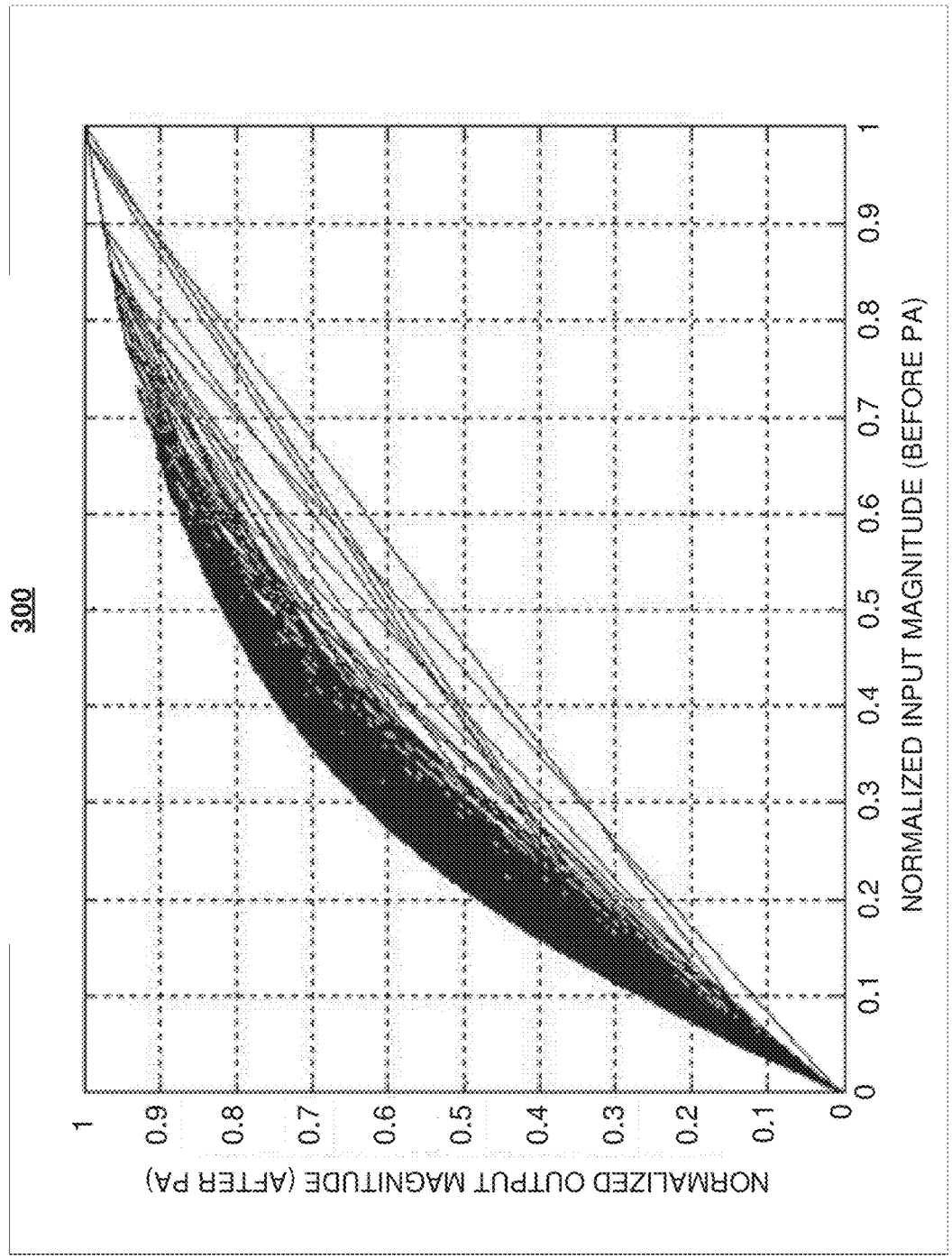
FIG. 3 depicts a block diagram of an example non-linear response of an example non-linear device, in an embodiment.
Figure 4:
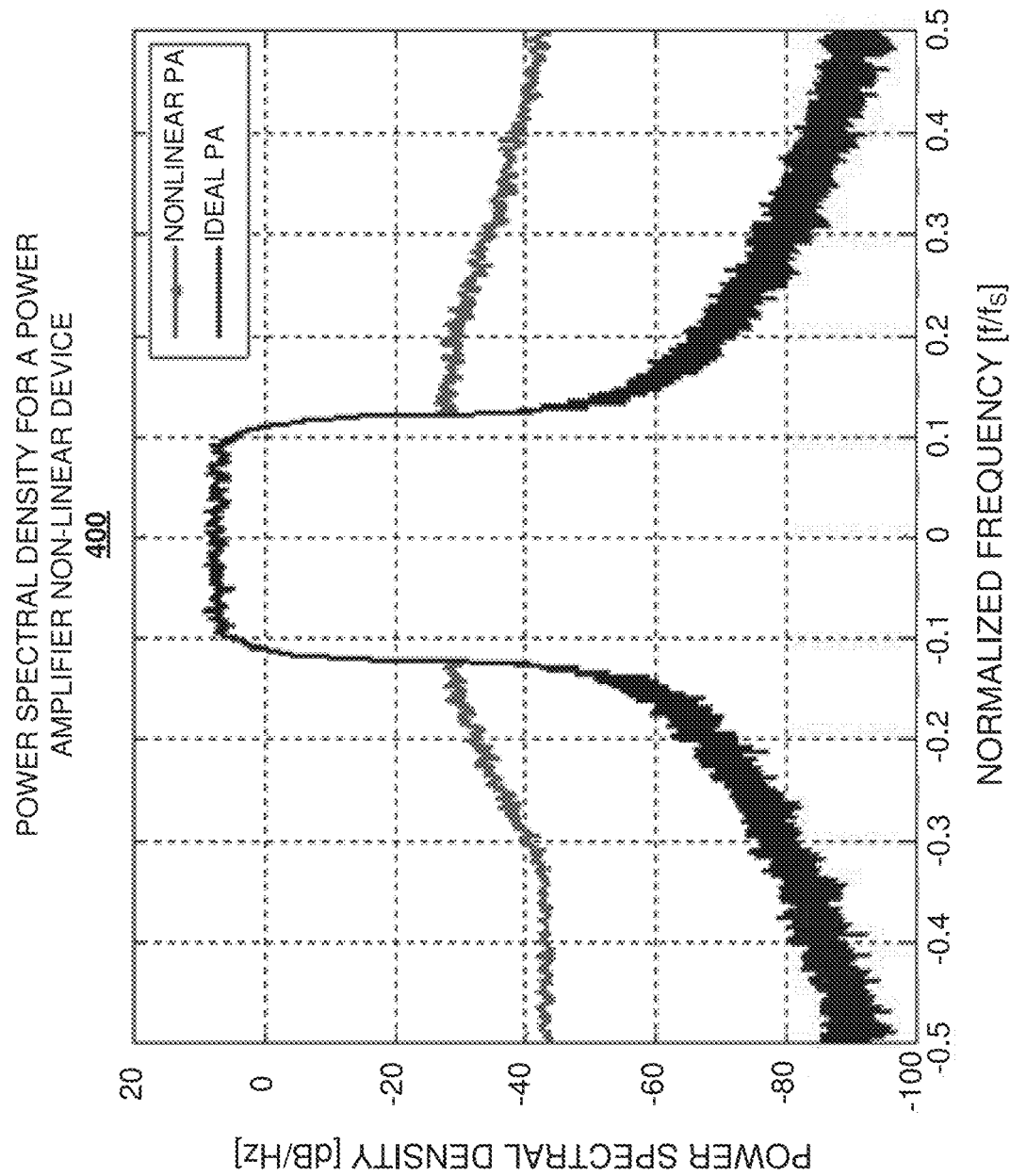
FIG. 4 illustrates an example power spectral density graph for a wireless transmission utilizing a non-linear power amplifier, in support of aspects of the disclosure.

FIG. 3 illustrates an example graph of a non-linear response 300 of a power amplifier non-linear device, according to various disclosed embodiments. The graph of FIG. 3 plots normalized input magnitude (before power amplification) on the horizontal axis, and normalized output magnitude (after power amplification) on the horizontal axis. As is evident from the graph, non-linear response 300 has a significant non-linearity. One side effect of a non-linear device on wireless transmissions is signal leakage outside of a target frequency band. An example of this phenomenon is illustrated by FIG. 4, which depicts a second graph of power spectral density 400 charting normalized frequency [f/$f_s$] versus power spectral density [dB/Hz]. As is evident from FIG. 4, power spectral density of transmissions having an ideal power amplifier achieves sharp cutoff outside a target frequency range, whereas the power spectral density of transmissions having a non-linear power amplifier leak significantly into adjacent frequencies. Signal leakage outside the target frequency range can have deleterious effects on efficacy of wireless communications, particularly for MIMO communications. The impact is such that the advantages of MIMO techniques, including diversity gain and multiplexing gain, are diminished.

Figure 5:
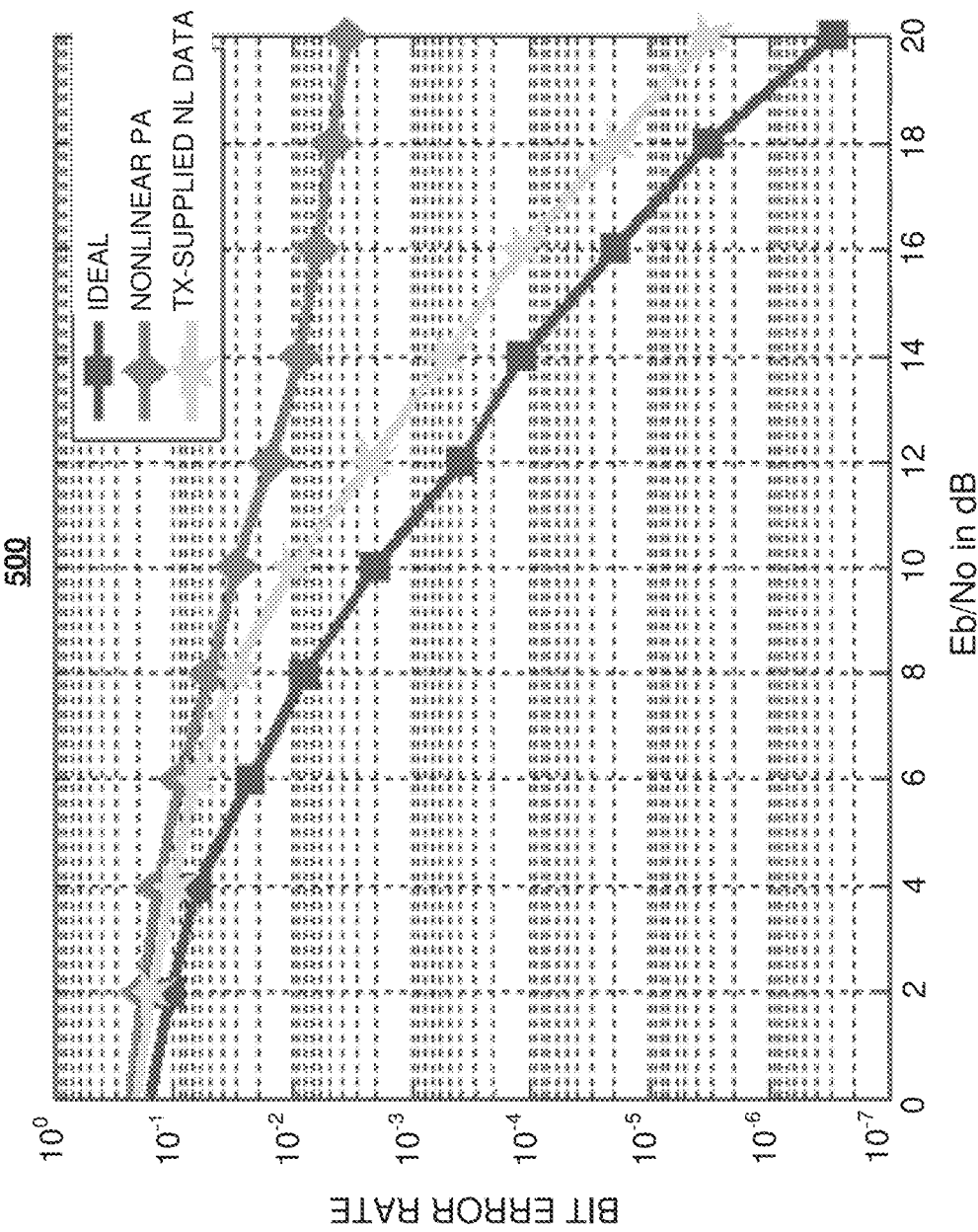
FIG. 5 depicts a sample bit error rate at a receiving device according to one or more embodiments of the present disclosure.

FIG. 5 illustrates a third graph of estimated bit error rate performance 500 at a receiving device in response to transmitter-supplied non-linear response data. The graph plots Eb/No in dB on the horizontal axis versus bit error rate on the vertical axis. The bit error rate performance at the receiving device is greatly improved in response to a receiving device employing transmitter-supplied non-linearity data as compared to the bit error rate performance of a non-linear device without signal processing enhancements. Bit error rate performance 500 illustrates the significant estimated benefit to the bit error rate performance provided by embodiments of the present disclosure.

Figure 6:
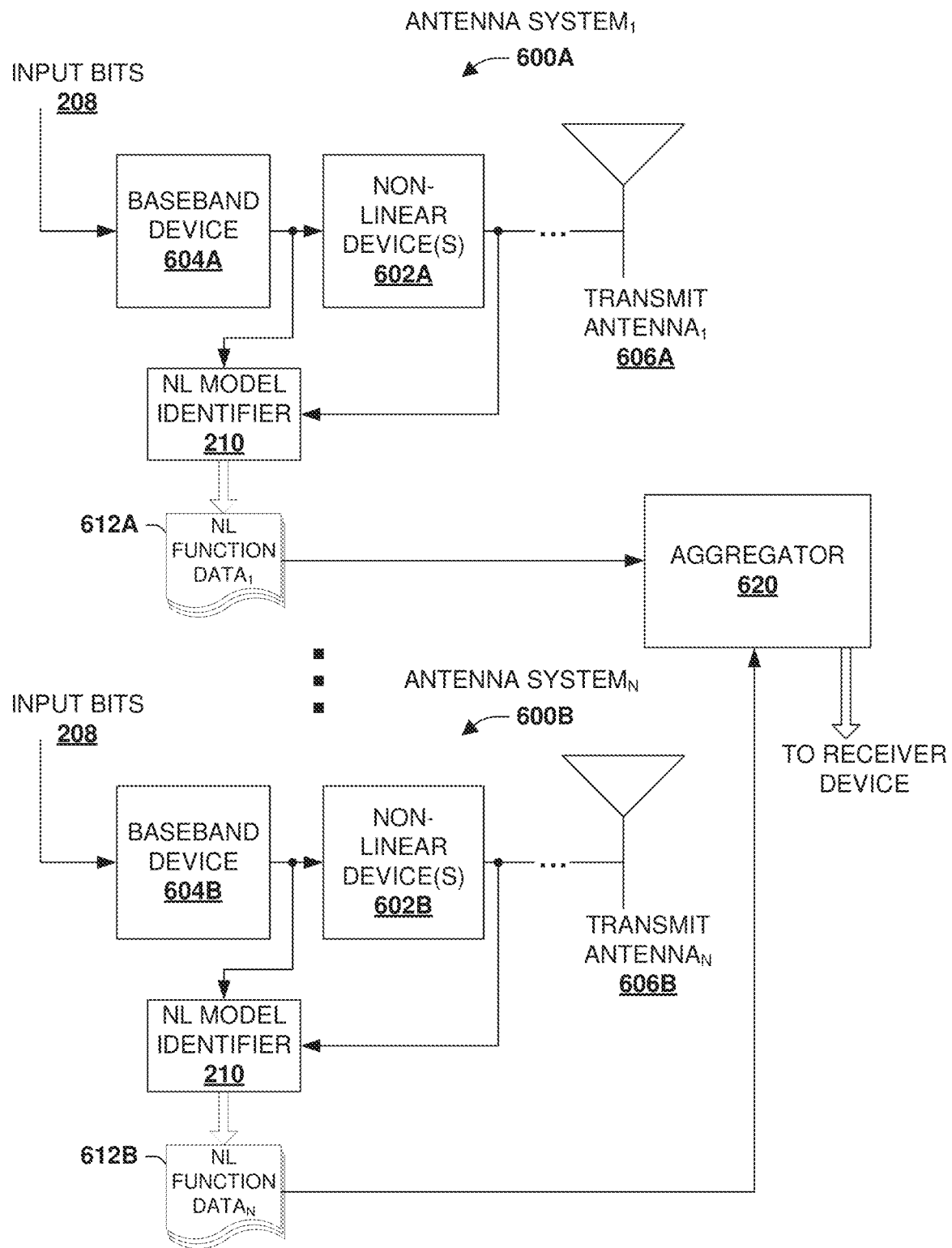
FIG. 6 illustrates a block diagram of an example transmit antenna system for a multiple-input, multiple-output antenna arrangement in further embodiments.

FIG. 6 illustrates a block diagram of an example multiple-antenna system 600 for MIMO downlink communications, in one or more embodiments. Multiple-antenna system 600 includes a first transmit antennae 606A through an Nth transmit antenna$_N$ 606B, where N is a suitable integer greater than one. Respective antenna systems 606A, 606B comprise one or more non-linear devices 602A, 602B and baseband devices 604A, 604B that receive input bits 208 and provide respective baseband signals to the non-linear devices 602A, 602B. A non-linear model identifier 210 receives the respective baseband signals and non-linear responses of the non-linear devices 602A, 602B and generates respective non-linear function responses for each of the non-linear devices 602A, 602B. Respective non-linear function data$_{1-N}$ can be included in messages 612A, 612B and transmitted to a receiving device for processing a wireless transmission received from multiple-antenna system 600. In an embodiment, an aggregator 620 can be employed to generate an aggregate of the respective non-linear function data for non-linear devices 602A, 602B, which can then be sent to the receiving device. In other embodiments, where non-linear devices 602A, 602B are substantially the same, or their non-linear function response functions f(•) are substantially the same, a representative one of non-linear function data$_{1-N}$ can be provided to the receiving device.

As a general explanation, take the case of a MIMO system with $N_t$ transmit antennas and $N_r$ receive antennas, where $N_t$ and $N_r$ are respective integers greater than 1. (Note that a bold symbol is utilized herein to represent a vector or matrix). A received signal vector Y at a receiving device can be expressed by equation (1) as:

$$r = HPu + n \qquad (1)$$

where r is of size $N_r \times 1$, H is the complex channel matrix of size $N_r \times N_t$, P is the precoding matrix of size $N_t \times N_L$, where $N_L$ is the number of transmission layers (also referred to as rank), u is the transmission vector of size $N_L \times 1$ and n is the noise vector of size $N_r \times 1$. According to equation (1), the transmission vector u is computed at an output of a non-linear device (e.g., a power amplifier, an oscillator, a DAC, etc.), using an identified static model of the non-linear device. The power amplifier is characterized by u=f(x), where x is the symbol vector input to the non-linear device (e.g., before power amplification, etc.) and f(•) is the non-linear function of the non-linear device. The received signal vector can be rewritten by equation (2) as follows:

$$r = HPf(x) + n \quad (2)$$

by substitution for u.

The receiving device can employ the maximum likelihood detection algorithm that minimizes the probability of sequence error as follows:

$$P_s = P(x \neq \hat{x}) \quad (3)$$

where $\hat{x}$ is the estimate of x at the receiver. Equation (3) can be rewritten as $$P_s = P(f(x) \neq \hat{f}(\hat{x}))$$

noting that minimizing $P_S$ is then approximately equivalent to maximizing the probability of correctly estimating x, which can be expressed as follows:

$$P_s = \underset{\hat{f}(\hat{x})}{\mathrm{argmax}} P(f(x) = \hat{f}(\hat{x}) \mid Y, HP),$$

Applying Baye's theorem yields:

$$P(f(x) = \hat{f}(\hat{x}) \mid r, HP) = \frac{p_{r|f(x),HP}(r \mid f(x) = \hat{f}(\hat{x}), HP)}{p_{r|HP}(r \mid H)} \cdot P(f(x) = \hat{f}(\hat{x}))$$

where $p_{r|f(x)}$ and $p_{r|HP}$ are the conditional probability density functions of r given (f(x), HP) and HP, respectively. From the above equation, $p_{r|HP}(r|HP)$ is independent of the applied hypothesis $\hat{f}(\hat{x})$. In addition, for equally likely sequences, $P(f(x) = \hat{f}(\hat{x}))$ is independent of $\hat{f}(\hat{x})$, and therefore these two terms do not affect the selection of $\hat{x}$. As a result, the following is obtained:

$$P_s = \underset{\hat{f}(\hat{x})}{\mathrm{argmax}} p_{r|f(x),HP}(r \mid f(x) = \hat{f}(\hat{x}), HP)$$

which can be rewritten as:

$$p_{r|f(x),HP}(r|f(x)=\hat{f}(\hat{x}),HP) = p_n(r - HP\hat{f}(\hat{x}))$$

where $p_n$ is the Gaussian probability density function. For additive white Gaussian noise (AWGN) channels, maximizing $p_n$ is equivalent to minimizing $\|r - HP\hat{f}(\hat{x})\|^2$. Accordingly, the maximum likelihood estimate of x is given by equation (4):

$$\hat{x}_{ML} = \underset{\hat{f}(\hat{x})}{\mathrm{argmin}} \|r - HP\hat{f}(\hat{x})\|^2 \quad (4)$$

A receiving device can employ a maximum likelihood detector to choose the message $\hat{x}$ as the one giving the smallest distance between the received vector r and the hypothesized message $HP\hat{f}(\hat{x})$.

As stated previously, a receiving device according to the subject disclosure can utilize non-linear function $data_{1-N}$ in messages 612A, 612B at least in part to determine the maximum likelihood estimation of the received message bits. In further embodiments, the non-linear function data can be utilized in conjunction with channel information and precoding information for determining the maximum likelihood estimation of the received message bits.

Figure 7:
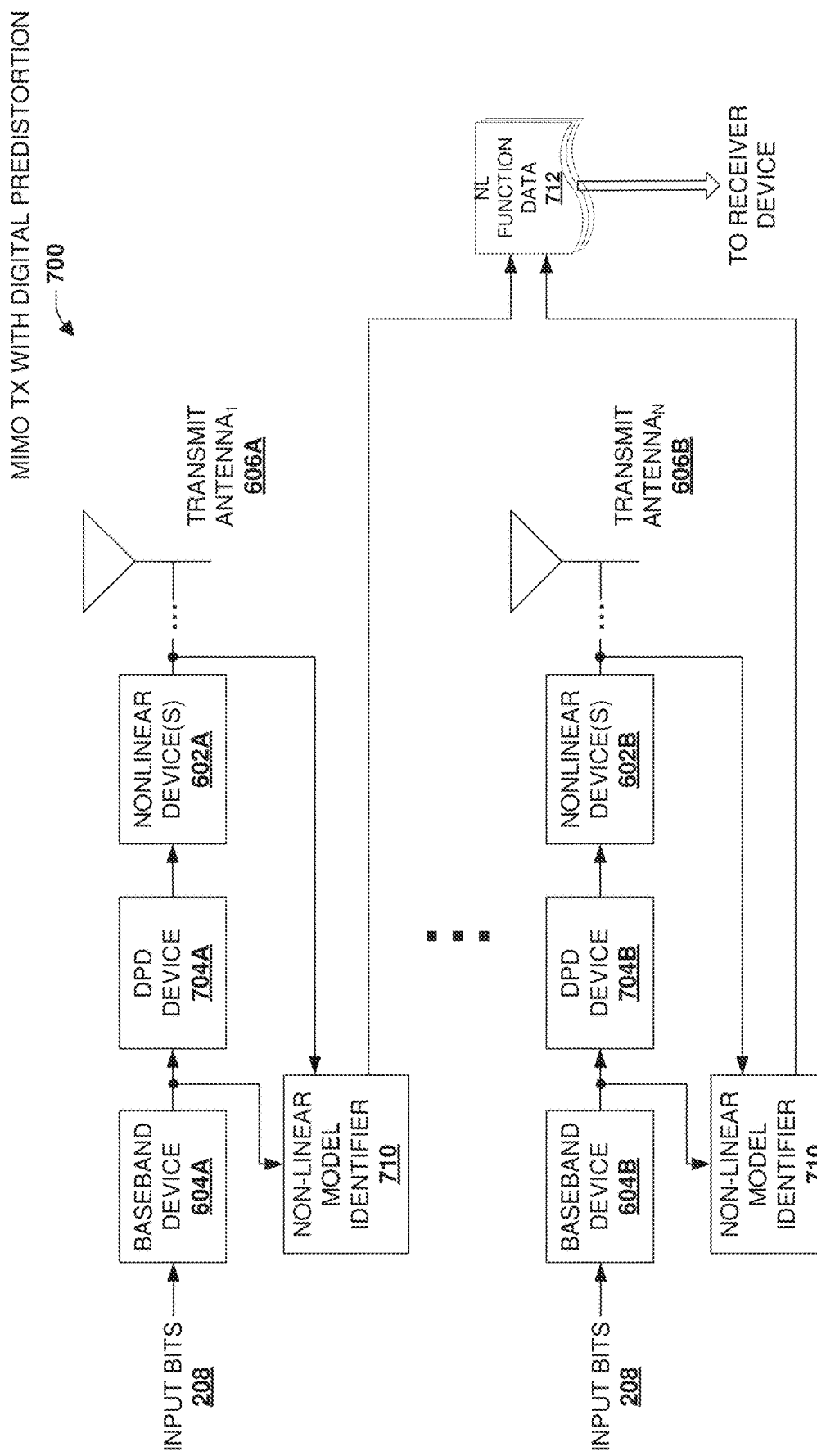
FIG. 7 illustrates a block diagram of an example embodiment of transmitter-provided non-linearity data utilizing digital pre-distortion.

FIG. 7 depicts a block diagram of an example MIMO transmission with digital pre-distortion 700 according to alternative or additional embodiments of the present disclosure. MIMO transmission with digital pre-distortion 700 can employ multiple antennas 606A, 606B connected to respective non-linear devices 602A, 602B (or respective groups of non-linear devices 602A, 602B). A set of input bits 208 are provided to a baseband device 604A, 604B for each antenna 606A, 606B, which respectively output a baseband signal. The baseband signals are provided to DPD devices 704A, 704B, which distort the baseband signals and output the distorted baseband signals to the non-linear devices 602A, 602B. In an embodiment, DPD devices 704A, 704B can comprise signal linearization circuitry, or the like.

Non-linear devices 602A, 602B can be configured to identify dynamic (as opposed to static) non-linear relation between an output of nonlinear device(s) 602A, 602B and the baseband input to DPD devices 704A, 704B. In an embodiment, non-linear model identifier 710 can be substantially similar to non-linear model identifier 210, described above. In alternative or additional embodiments, non-linear model identifier 710 can employ, e.g., a finite impulse response (FIR) filter, or state space model in conjunction with fitting a basis function to the non-linear response of DPD devices 704A, 704B and non-linear devices 602A, 602B to identify the dynamic non-linear response functions of such devices. Once generated, non-linear function data can be provided in a message 712 transmitted to a receiving device to facilitate decoding of a signal transmitted by MIMO transmission with digital pre-distortion 700, utilizing the non-linear function data. Employing the digital pre-distortion in conjunction with the transmitter-supplied non-linear function data can potentially further improve bit error rates at the receiving device, without significant increase in the power and processing overhead required to implement the digital pre-distortion of the baseband signal.

Figure 8:
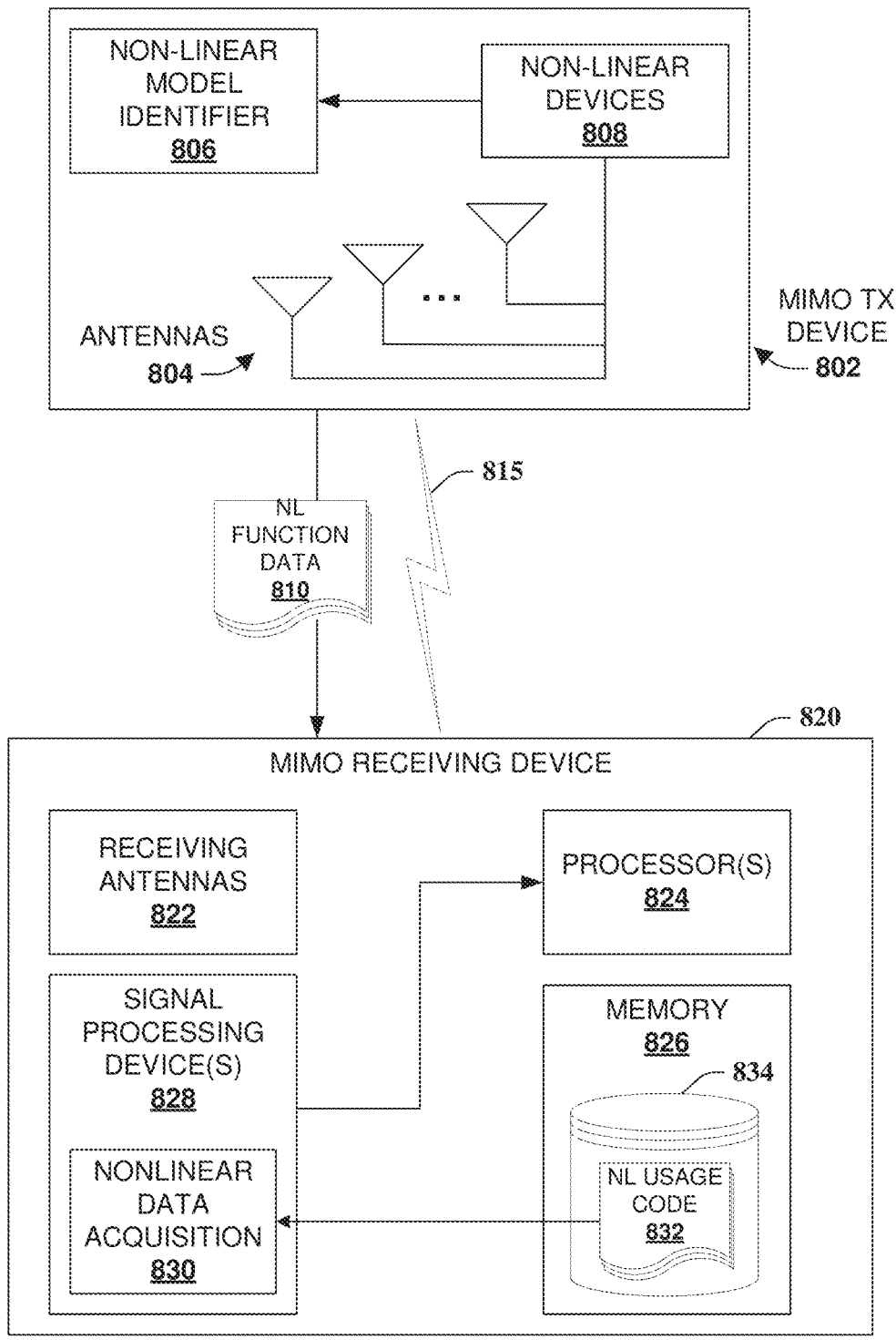
FIG. 8 depicts a block diagram of a sample embodiment of a MIMO receiving device utilizing transmitter-provided non-linearity data for signal processing.

FIG. 8 illustrates a block diagram of an example MIMO communication 800 according to alternative or additional embodiments of the present disclosure. MIMO communication 800 can comprise a MIMO transmit device 802 and a MIMO receiving device 820 communicatively coupled over a wireless link 815. MIMO transmit device 802 can comprise multiple antennas 804 connected to one or more non-linear devices 808. Non-linear devices 808 can comprise a non-linear power amplifier(s), a non-linear oscillator(s), a non-linear DAC, or the like, or a suitable combination of the foregoing. A non-linear model identifier 806 is provided to map (e.g., estimate) a non-linear response of non-linear devices 808. The mapping can be via a polynomial fit (e.g., criterion minimization solving a least squares problem, Bayesian techniques utilizing Kalman filter, and so forth), or other suitable mathematical characterization, that models a non-linear function response of non-linear devices 808.

Once generated, the non-linear function response is provided in a message 810 to MIMO receiving device 820.

Message 810 can be transmitted as part of call setup signaling establishing the wireless link 815 between MIMO transmit device 802, and MIMO receiving device 820, in an embodiment. In other embodiments, message 810 can be transmitted as part of physical layer signaling over wireless link 815.

MIMO receiving device 820 can be a wireless receiver, a user equipment (e.g., UE $102_{1-n}$ of FIG. 1, supra), a mobile wireless device, and so forth. As illustrated, MIMO receiving device 820 can comprise a plurality of receive antennas 822 for acquiring wireless transmissions on wireless link 815. Additionally, MIMO receiving device 820 can comprise a processor(s) 824, and memory 826 that stores executable instructions that, when executed by processor(s) 824, facilitate performance of operations of MIMO receiving device 820. Memory 826 can comprise a data storage 834, in an embodiment, storing non-linear usage code 832 comprising executable instructions for employing non-linear function data in conjunction with processing a received wireless signal. In an embodiment, the operations can comprise utilizing the non-linear function data, at least in part, as soft input information for determining a maximum likelihood estimation of data bits within the received wireless signal.

A signal processing device(s) 828 can obtain the received signal from receiving antennas 822. A non-linear data acquisition device 830 can obtain nonlinear function data provided in message 810 (e.g., according to message decoding instructions provided in non-linear usage code 832, in an embodiment). Message 810 can be acquired from signaling transmissions during setup of wireless link 815, in an embodiment. In other embodiments, message 810 can be acquired from physical layer data transmissions of wireless link 815. Once received, non-linear function data within message 810 is extracted and utilized in conjunction with decoding the received wireless signal from receiving antennas 822. In various embodiments, the non-linear function data is utilized in conjunction with channel information and precoding information to determine maximum likelihood estimates for received data, as described herein.

FIG. 9 illustrates an example non-linear data model 900 and format for transmission, according to one or more additional embodiments of the present disclosure. Non-linear data model 900 can include identifying indicia of a basis function mapped to a non-linear response of a non-linear device(s) utilized in an active-array-antenna arrangement. The identifying indicia can be suitable to enable a receiving device to recreate the basis function mapped to the non-linear response, and as a result generate a high accuracy estimation of the non-linear response to achieve good signal decoding with improved bit error rate performance, in wireless communications.

Identifying indicia for non-linear data model 900 can include a model type 902, indicating a type of basis function utilized to mathematically characterize the non-linear response of the non-linear device(s). Examples specified include a voltera series, a polynomial and a memory polynomial, although other mathematical basis functions known in the art or made known to one of ordinary skill in the art by way of the context provided herein are considered within the scope of the present disclosure. An index 904 can alternatively or additionally be specified to refer to the type of basis function (rather than specify the basis function explicitly, in an embodiment). An order 906 of the basis function can be provided, as well as a memory length 908 in some embodiments. Moreover, coefficients of the basis function utilized to map the basis function to the non-linear response are also included within non-linear data model 900.

The aforementioned diagrams have been described with respect to interaction between systems, networks, antenna arrays, wired or wireless devices, or the like. It should be appreciated that such diagrams can include those systems, antenna arrays or devices specified therein, some of the specified systems, antenna arrays or devices, or additional such entities. For example, mobile communication system 100 could include mobile network 106 and MIMO receiving device 820, separate from or included within UEs $102_{1-n}$, in conjunction with network node $104_1$, which could include antenna system 200, as one of several possible examples, as would be recognized by one of skill in the art given the context provided by this disclosure. Sub-components could also be implemented as components communicably connected to other sub-components rather than included within a parent component. Additionally, it should be noted that two or more components could be combined into a single component providing aggregate functionality. For instance, non-linear model identifier 210 of FIG. 6 can be separate devices connected to respective antenna $systems_{1-n}$ 606A, 606B, or can be a single device connected to each of antenna $systems_{1-n}$ 606A, 606B, optionally incorporating aggregator 620 within such device(s). Components of the disclosed networks, systems, antenna arrays or devices can also interact with one or more other components not specifically described herein but known by those of skill in the art, or made known to one of skill in the art by way of the context provided herein.

Methods in accordance with the disclosed subject matter are provided herein and illustrated as flowcharts. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

In accordance with some example embodiments, a computing device (e.g., network node 104, antenna system 200, non-linear model identifier 210, and so forth) can be operable to perform example methods and operations, as illustrated in flow diagrams as shown in FIGS. 10-13 and described in the corresponding text, in accordance with various aspects and embodiments of the subject disclosure. Additionally, machine-readable storage medium, comprising executable instructions that, when executed by a processor, can also facilitate performance of the methods and operations described in FIGS. 10-13.

Figure 10:
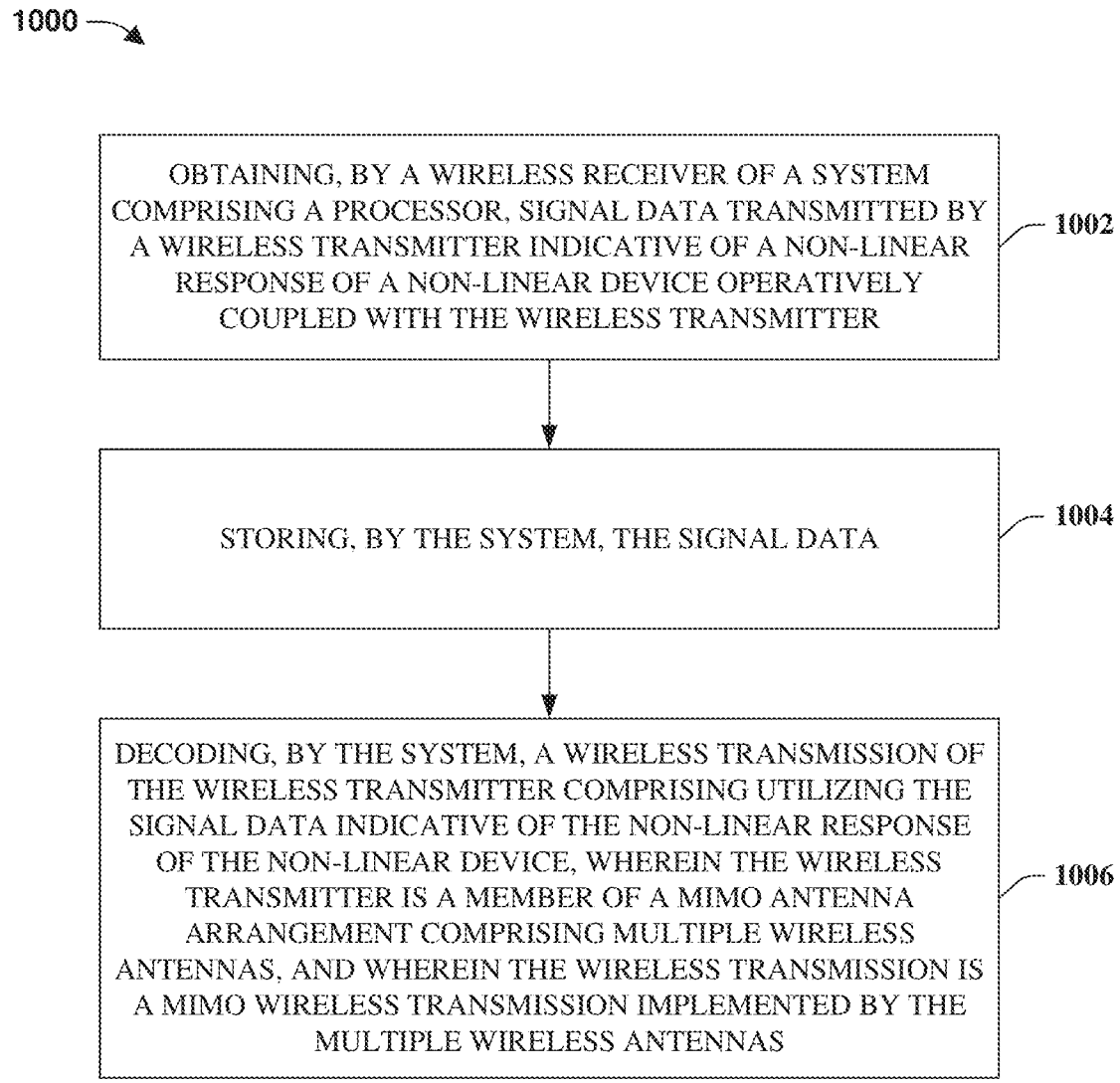
FIG. 10 shows a flowchart of an example method for achieving improved signal processing for wireless communication according to other embodiments.

In non-limiting embodiments (also referred to as example embodiments), a network device (e.g., network node 104), comprising a processor and a memory that stores executable instructions that, when executed by the processor, facilitate performance of example operations 1000, as shown in FIG. 10. The network device can comprise antennas, and be operable to use the antennas to communicate via a massive multiple in multiple out protocol.

The operations can comprise, at 1002, obtaining, by a wireless receiver of a system comprising a processor, signal data transmitted by a wireless transmitter indicative of a non-linear response of a non-linear device operatively coupled with the wireless transmitter. The wireless transmitter can be a MIMO antenna system, in an embodiment. Further, the signal data can include data indicative of a basis function fit to the non-linear response of the non-linear device. In various embodiments, the non-linear device can comprise a power amplifier, a DAC, an oscillator, or other suitable non-linear device suitable for use in conjunction with a wireless transmitter.

At 1004, method 1000 can comprise storing, by the system, the signal data. At 1006, method 1000 can comprise decoding, by the system, a wireless transmission of the wireless transmitter comprising utilizing the signal data indicative of the non-linear response of the non-linear device. In various embodiments, the wireless transmitter is a member of a MIMO antenna arrangement comprising multiple wireless antennas. In further embodiments, the wireless transmission is a MIMO wireless transmission implemented by the multiple wireless antennas.

In an embodiment, decoding the wireless transmission can further comprise utilizing the signal data in conjunction with a maximum likelihood function to determine data received with the wireless transmission. In further embodiments, the signal data can comprise coefficients of a basis function fit to the non-linear response of the non-linear device at the wireless transmitter. In one or more additional embodiments, the method can comprise reconstructing, by the system, the basis function fit to the non-linear response utilizing the coefficients of the basis function.

In alternative embodiments, method 900 can comprise obtaining, by the system, the signal data from call setup signaling associated with the initiation of the wireless transmission. In a further alternative embodiment, the signal data represents an aggregate of non-linear responses of a group of non-linear devices, comprising the non-linear device, respectively operatively coupled to the multiple wireless antennas of the multiple-input, multiple-output antenna arrangement.

In one or more additional embodiments, obtaining the signal data can further comprise extracting an identifier indicative of a type of basis function characterizing the non-linear response of the non-linear device, and identifying the type of basis function from the identifier. Further, the method can comprise determining an order of the basis function and a memory length of the basis function from the signal data, and extracting the coefficients of the basis function from the signal data. Additionally, the method can comprise reconstructing the basis function characterizing the non-linear response of the non-linear device from the type of basis function, the order of the basis function, the memory length of the basis function, and the coefficients of the basis function, and utilizing the basis function characterizing the non-linear response of the non-linear device in conjunction with the decoding of the wireless transmission of the multiple-input, multiple-output wireless transmission.

In yet another embodiment, receiving the signal can further comprise obtaining the signal data from physical layer signaling transmitted by the wireless transmitter. For instance, the method can comprise monitoring the physical layer signaling for a change in the signal data reflecting an update to the non-linear response of the non-linear device operatively coupled with the wireless transmitter.

Figure 11:
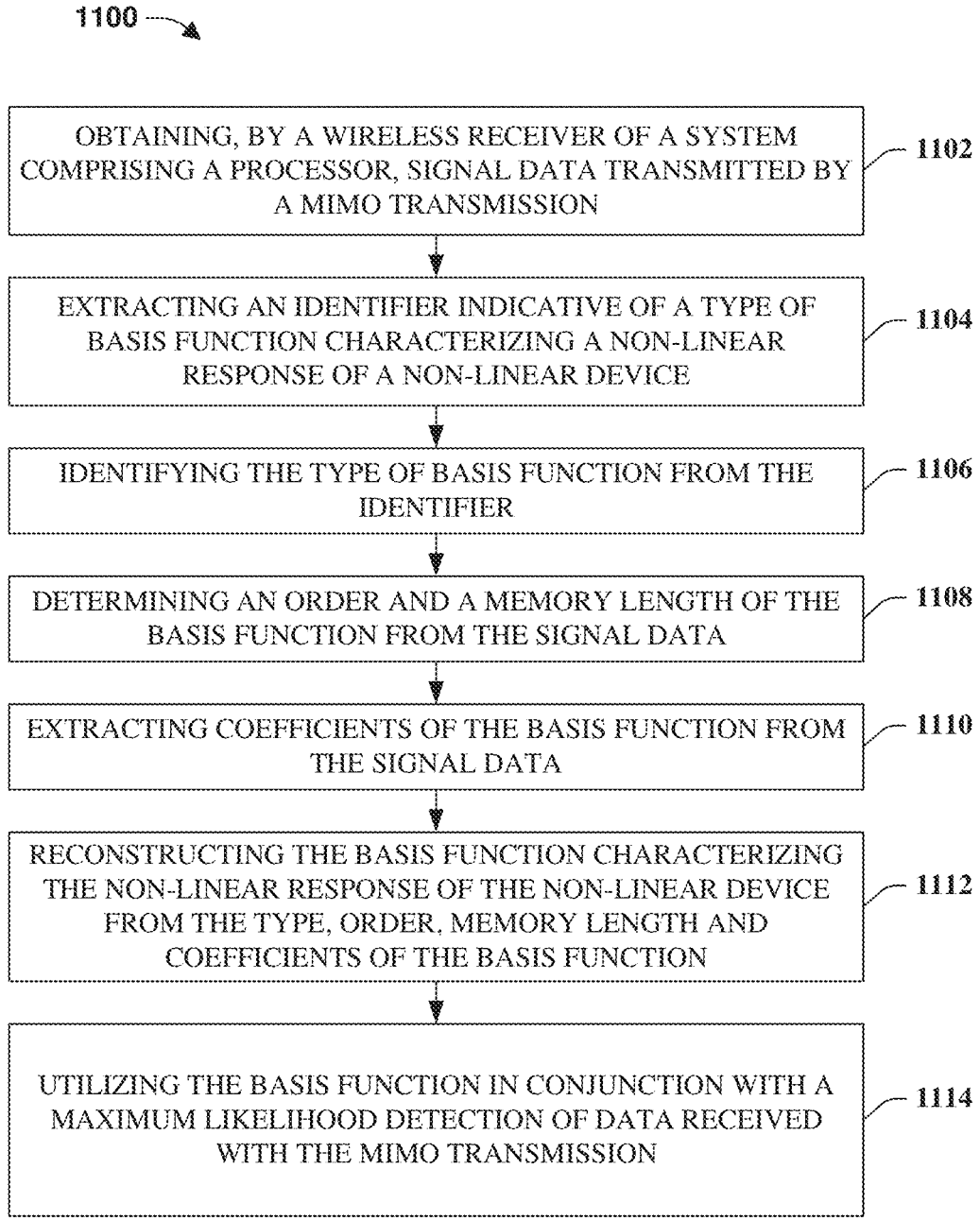
FIG. 11 depicts a flowchart of a sample method for achieving improved signal processing in a massive MIMO wireless communication environment in still other embodiments.

Referring now to FIG. 11, there is depicted a flowchart of an example method 1100 according to additional embodiments of the present disclosure. At 1102, method 1100 can comprise obtaining, by a wireless receiver (or receivers) of a system comprising a processor, signal data transmitted by a MIMO transmission. At 1104, method 1100 can comprise extracting an identifier indicative of a type of basis function characterizing a non-linear response(s) of a non-linear device(s). The non-linear response(s) can be a non-linear function(s) of the non-linear device(s), which can be connected to one or more active-array-antennas sending the MIMO transmission. At 1106, method 1100 can comprise extracting an identifier indicative of a type of basis function characterizing a non-linear response of a non-linear device, at 1106 identifying the type of basis function from the identifier, and determining an order and a memory length of the basis function from the signal data at 1108. At 1110, method 1100 can additionally comprise extracting coefficients of the basis function from the signal data.

At 1112, method 1100 can comprise reconstructing the basis function characterizing the non-linear response of the non-linear device from the type, order, memory length and coefficients of the basis function. Additionally, at 1114, method 1100 can comprise utilizing the basis function in conjunction with a maximum likelihood detection of data received with the MIMO transmission.

Figure 12:
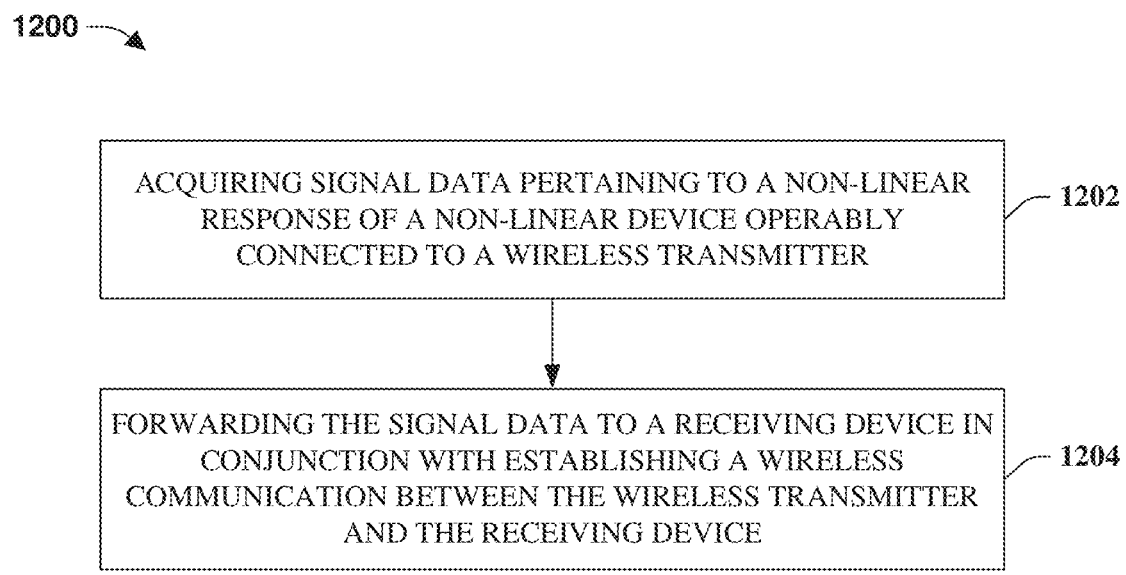
FIG. 12 illustrates a flowchart of an example method for facilitating improved signal processing for a receiving device, in an embodiment.

FIG. 12 illustrates a flowchart of an example method 1200 for facilitating improved wireless transmission, according to additional embodiments of the present disclosure. In some embodiments, method 1200 can be implemented for a multiple antenna transmission. In one or more embodiments, method 1200 can be implemented in conjunction with a massive MIMO wireless transmission for a 5G wireless communication network.

At 1202, method 1200 can comprise acquiring signal data pertaining to a non-linear response of a non-linear device operably connected to a wireless transmitter. The non-linear response can be a non-linear function of a non-linear power amplifier, DAC, oscillator, or the like, connected to a massive MIMO active antenna array, in various embodiments.

At 1204, method 1200 can comprise forwarding the signal data to a receiving device in conjunction with establishing a wireless communication between the wireless transmitter and the receiving device. The signal data can be transmitted according to a data model. The data model can specify a type of basis function employed for fitting the non-linear response of the non-linear device. Alternatively, or additionally, the data model can include an index indicative of the type of basis function. Further, an order, memory length and coefficients for the data model can be specified within the signal data forwarded to the receiving device.

FIG. 13 depicts a flowchart of a sample method 1300 for facilitating improved bit error rate performance for a wireless transmission, according to additional embodiments of the present disclosure. At 1302, method 1300 can comprise initiating, by a system comprising a processor, a non-linear electronic device in conjunction with a MIMO wireless transmission. At 1304, method 1300 can comprise fitting, by the system, a non-linear response of the non-linear electronic device to a mathematical model. Moreover, at 1306, method 1300 can comprise writing coefficients, order and memory length of the mathematical model to a data message. In addition to the foregoing, method 1300 can comprise specifying a type and index of the mathematical model in the data message at 1308. At 1310, method 1300 can comprise transmitting the data message to a MIMO receiver device of the MIMO wireless transmission.

Figure 14:
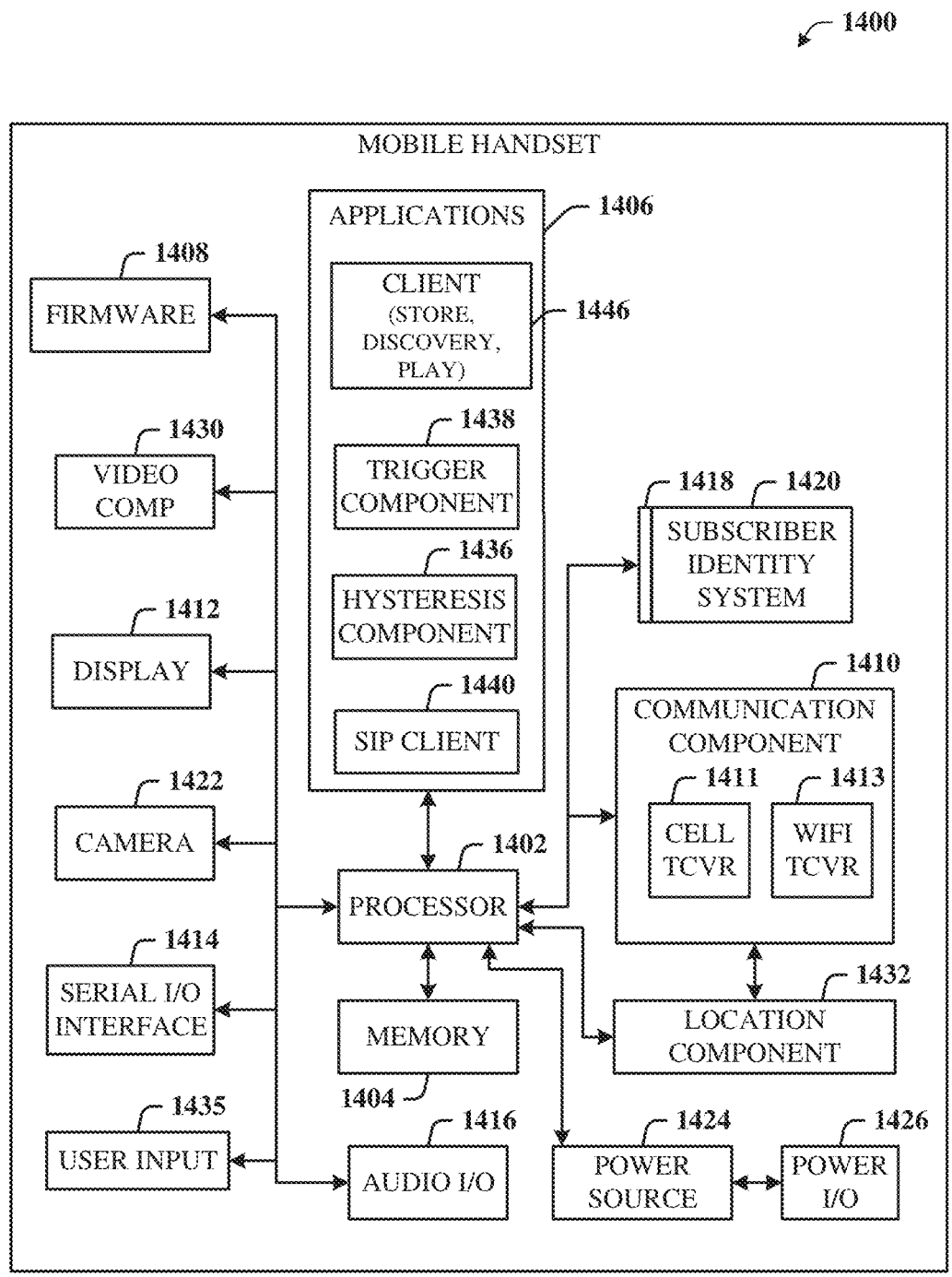
FIG. 14 illustrates an example block diagram of an example mobile handset, which can be a UE, in accordance with various embodiments of the subject disclosure.

Referring now to FIG. 14, illustrated is a schematic block diagram of a user equipment (e.g., UE 102, etc.) that can be a mobile handset 1400 capable of connecting to a network in accordance with some embodiments described herein. Although a mobile handset 1400 is illustrated herein, it will be understood that other devices can be a mobile device, and that the mobile handset 1400 is merely illustrated to provide context for the embodiments of the various embodiments described herein. The following discussion is intended to provide a brief, general description of an example of a suitable environment 1400 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The mobile handset 1400 includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 or in a firmware 1408, and executed by the processor 1402 from either or both the memory 1404 or the firmware 1408. The firmware 1408 can also store startup code for execution in initializing mobile handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a global GSM transceiver) and/or an unlicensed transceiver 1413 (e.g., Wi-Fi, WiMax) for corresponding signal communications. The mobile handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The mobile handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired or wireless serial communications (e.g., USB, and/or IEEE 1394) through a hardwire connection, and other serial input devices (e.g., a keyboard, keypad, and mouse). This supports updating and troubleshooting the mobile handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The mobile handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the mobile handset 1400, and updated by downloading data and software.

The mobile handset 1400 can process IP data traffic through the communication component 1410 to accommodate IP traffic from an IP network such as, for example, the Internet, a corporate intranet, a home network, a person area network, etc., through an ISP or broadband cable provider. Thus, VoIP traffic can be utilized by mobile handset 1400 and IP-based multimedia content can be received in either an encoded or decoded format.

A video processing component 1422 (e.g., a camera) can be provided for decoding encoded multimedia content. The video processing component 1422 can aid in facilitating the generation, editing and sharing of video quotes. The mobile handset 1400 also includes a power source 1424 in the form of batteries or an AC power subsystem, which power source 1424 can interface to an external power system or charging equipment (not shown) by a power I/O component 1426.

The mobile handset 1400 can also include a video component 1430 for processing video content received and, for recording and transmitting video content. For example, the video component 1430 can facilitate the generation, editing and sharing of video quotes. A location tracking component 1432 facilitates geographically locating the mobile handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1438 when the Wi-Fi transceiver 1413 detects the beacon of the access point. A session initiation protocol (SIP) client 1440 enables the handset 1400 to support SIP protocols and register the subscriber with the SIP registrar server. The applications 1406 can also include a client 1442 that provides at least the capability of discovery, play and store of multimedia content, for example, music.

The mobile handset 1400, as indicated above related to the communications component 1410, includes an indoor network radio transceiver 1413 (e.g., Wi-Fi transceiver). This function supports the indoor radio link, such as IEEE 802.11, for mobile handset 1400. The mobile handset 1400 can accommodate at least satellite radio services through a handset that can combine wireless voice and digital radio chipsets into a single handheld device.

Figure 15:
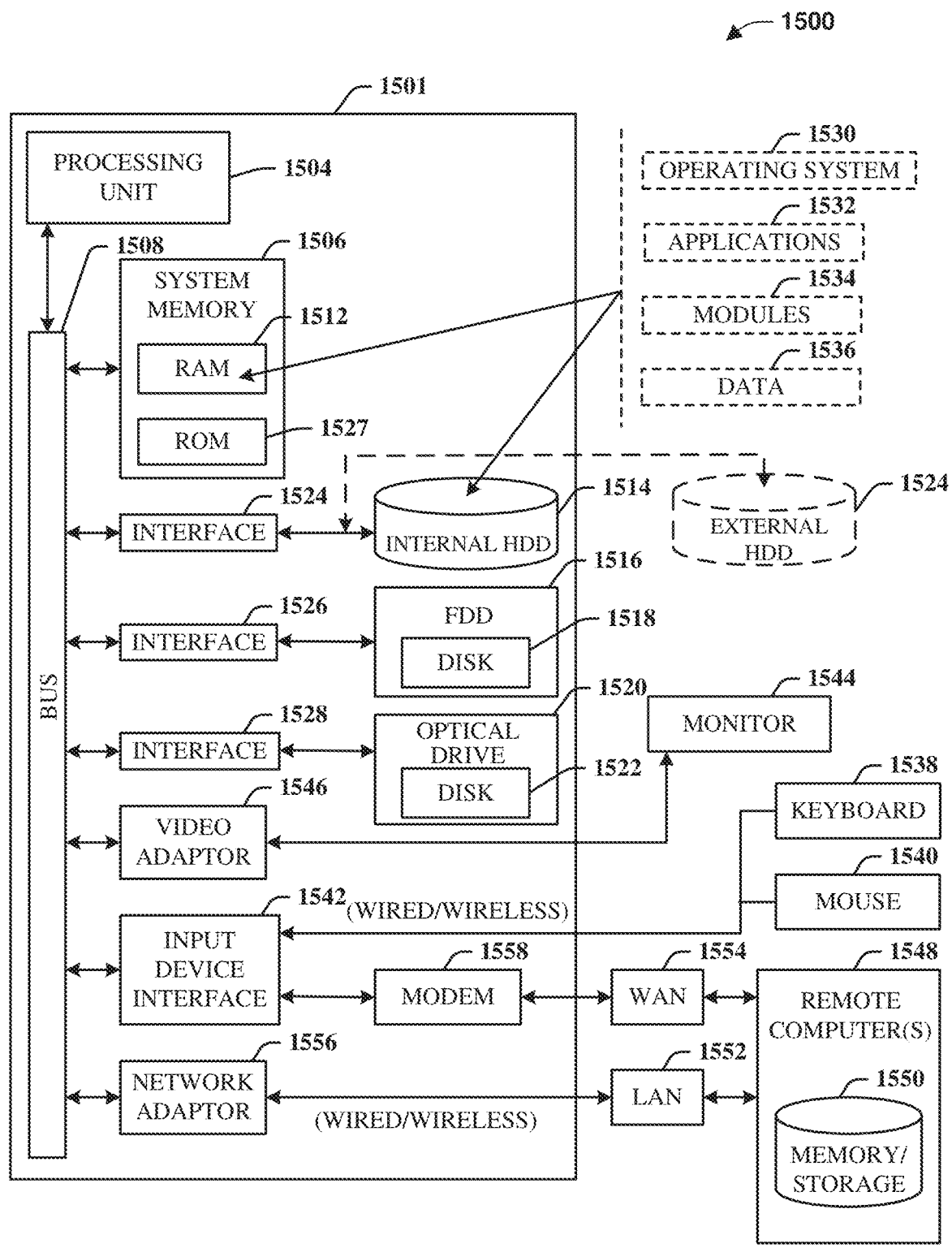
FIG. 15 illustrates an example block diagram of a computer, e.g., a network node, which can be operable to execute processes and methods disclosed herein.

Referring now to FIG. 15, there is illustrated a block diagram of a computer 1500 operable to execute the functions and operations performed in the described example embodiments. For example, a network node (e.g., network node 104) may contain components as described in FIG. 15. The computer 1500 can provide networking and communication capabilities between a wired or wireless communication network and a server or communication device. In order to provide additional context for various aspects thereof, FIG. 15 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 15, implementing various aspects described herein with regards to devices (e.g., network node 104, UE $102_{1-n}$, non-linear model identifier 210, among others) can include a computer 1500, the computer 1500 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes read-only memory (ROM) 1527 and random access memory (RAM) 1512. A basic input/output system (BIOS) is stored in a non-volatile memory 1527 such as ROM, EPROM, EEPROM, which BIOS contains the basic routines that help to transfer information between elements within the computer 1500, such as during start-up. The RAM 1512 can also include a high-speed RAM such as static RAM for caching data.

The computer 1500 further includes an internal hard disk drive (HDD) 1514 (e.g., EIDE, SATA), which internal hard disk drive 1514 can also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1500, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1500, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1500 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 through an interface, such as a video adapter 1546. In addition to the monitor 1544, a computer 1500 typically includes other peripheral output devices (not shown), such as speakers, printers, etc.

The computer 1500 can operate in a networked environment using logical connections by wired and/or wireless communications to one or more remote computers, such as a remote computer(s) 1548. The remote computer(s) 1548 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1500 is connected to the local network 1552 through a wired and/or wireless communication network interface or adapter 1556. The adapter 1556 may facilitate wired or wireless communication to the LAN 1552, which may also include a wireless access point disposed thereon for communicating with the wireless adapter 1556.

When used in a WAN networking environment, the computer 1500 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 through the input device interface 1542. In a networked environment, program modules depicted relative to the computer, or portions thereof, can be stored in the remote memory/storage device 1550. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" where used herein means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor, facilitate performance of operations, comprising:
   acquiring signal data indicative of a characterization of a non-linear power response of a non-linear device associated with a wireless antenna element; and
   transmitting, via the wireless antenna element, the signal data indicative of the characterization of the non-linear power response to a user equipment, wherein the characterization comprises an index identifying a type of a basis function corresponding to the non-linear power response.

2. The system of claim 1, wherein the acquiring comprises acquiring the signal data in response to activation of the non-linear device.

3. The system of claim 1, wherein the transmitting comprises transmitting the signal data in response to establishing a wireless communication between the user equipment and a wireless transmitter that comprises the wireless antenna element.

4. The system of claim 1, wherein the non-linear device is a first non-linear device, wherein the wireless antenna element is a first wireless antenna element, wherein the non-linear power response is a first non-linear power response, wherein the signal data is first signal data, and wherein the operations further comprise:
   acquiring second signal data indicative of a second non-linear power response of a second non-linear device associated with a second wireless antenna element.

5. The system of claim 4, wherein the operations further comprise:
   aggregating the first signal data and the second signal data to generate aggregated signal data for decoding of a wireless communication at the user equipment, and wherein the transmitting comprises transmitting the aggregated signal data to the user equipment.

6. The system of claim 1, wherein the non-linear device is a first non-linear device, wherein the wireless antenna element is a first wireless antenna element, wherein the non-linear power response is a first non-linear power response, and wherein the operations further comprise:
   based on the signal data, estimating a second non-linear power response of a second non-linear device associated with a second wireless antenna element.

7. The system of claim 1, wherein the operations further comprise:

mapping the basis function to the non-linear power response of the non-linear device.

8. The system of claim 7, wherein the signal data comprises a coefficient of the basis function mapped to the non-linear power response.

9. The system of claim 7, wherein the basis function comprises a polynomial expansion fit between an input signal and an output signal of the non-linear device.

10. The system of claim 1, wherein the transmitting comprises transmitting the signal data to the user equipment via a signaling layer associated with a wireless communication between the user equipment and a wireless transmitter that comprises the wireless antenna element.

11. The system of claim 1, wherein the transmitting comprises transmitting the signal data to the user equipment via a physical layer of a wireless channel.

12. The system of claim 1, wherein the signal data comprises an order of the basis function, a memory length of the signal data, or a coefficient of the basis function.

13. A method, comprising:
obtaining, by a device comprising a processor, signal data comprising a characterization of a non-linear response of a non-linear device operatively coupled with a wireless transmitter; and
transmitting, by the device, the signal data of the non-linear response via a wireless transmission associated with the wireless transmitter, wherein the signal data comprises an index referencing a type of a basis function corresponding to the non-linear response.

14. The method of claim 13, wherein the transmitting comprises transmitting the signal data to a user equipment that is communicatively coupled to wireless transmitter.

15. The method of claim 13, further comprising:
aggregating, by the device, the signal data and different signal data to generate aggregated signal data for decoding of the wireless transmission, wherein the transmitting comprises transmitting the aggregated signal data to a user equipment communicatively coupled to the wireless transmitter.

16. The method of claim 13, further comprising:
mapping, by the device, the basis function to the non-linear response of the non-linear device.

17. The method of claim 13, wherein the obtaining comprises obtaining a coefficient of the basis function mapped to the non-linear response.

18. A non-transitory machine-readable medium, comprising executable instructions that, when executed by a processor, facilitate performance of operations, comprising:
receiving signal data indicative of a model of a non-linear response of a non-linear device operatively coupled with a wireless transmitter; and
transmitting the signal data indicative of the model of the non-linear response to a receiver device, wherein the model represents a type of a basis function that corresponds to the non-linear response.

19. The non-transitory machine-readable medium of claim 18, wherein the receiving comprises receiving at least a portion of a basis function mapped to the non-linear response.

20. The non-transitory machine-readable medium of claim 18, wherein the receiving comprises receiving a polynomial expansion fit associated with a mapping to the non-linear response.

* * * * *